(12) United States Patent
Fu et al.

(10) Patent No.: US 12,416,770 B2
(45) Date of Patent: Sep. 16, 2025

(54) OPTICAL EMISSION ASSEMBLY AND OPTICAL MODULE

(71) Applicants: DONGGUAN XUNTAO ELECTRONIC CO., LTD., Dongguan (CN); Dongguan Luxshare Technologies Co., Ltd, Dongguan (CN)

(72) Inventors: Chung-Hsin Fu, Taipei (TW); Min-Sheng Kao, Taipei (TW); Yi-Tseng Lin, Taipei (TW); Chih-Wei Yu, Taipei (TW)

(73) Assignees: DONGGUAN XUNTAO ELECTRONIC CO., LTD., Dongguan (CN); DONGGUAN LUXSHARE TECHNOLOGIES CO., LTD., Dongguan (CN)

( * ) Notice: Subject to any disclaimer, the term of this patent is extended or adjusted under 35 U.S.C. 154(b) by 186 days.

(21) Appl. No.: 18/204,994

(22) Filed: Jun. 2, 2023

(65) Prior Publication Data
US 2024/0210635 A1 Jun. 27, 2024

(30) Foreign Application Priority Data
Dec. 22, 2022 (CN) .......................... 202211653722.8

(51) Int. Cl.
*G02B 6/42* (2006.01)
*G02B 6/293* (2006.01)

(52) U.S. Cl.
CPC ....... *G02B 6/4215* (2013.01); *G02B 6/29361* (2013.01); *G02B 6/4272* (2013.01)

(58) Field of Classification Search
None
See application file for complete search history.

(56) References Cited

U.S. PATENT DOCUMENTS

| | | |
|---|---|---|
| 6,748,133 B2 | 6/2004 | Liu et al. |
| 7,212,343 B1 | 5/2007 | He et al. |
| 7,843,644 B1 | 11/2010 | Wang et al. |
| (Continued) | | |

FOREIGN PATENT DOCUMENTS

| | | |
|---|---|---|
| CN | 217543461 U | 10/2022 |
| TW | I709775 B | 11/2020 |

*Primary Examiner* — Jerry Rahll
(74) *Attorney, Agent, or Firm* — Birch, Stewart, Kolasch & Birch, LLP

(57) ABSTRACT

Disclosed is an optical emission assembly including a body, an adapter, two light-emitting assemblies, a multiplexer and a converging lens. The body is provided with a first positioning groove, a second positioning groove, an accommodation groove, and a through hole. The accommodation groove communicates with the first and second positioning grooves and the through hole. A groove bottom of the first positioning groove communicates with a groove bottom of the second positioning groove. The adapter is connected to the body and disposed corresponding to the through hole. When the two light-emitting assemblies are installed in the first and second positioning grooves, each light-emitting chip of each light-emitting assembly emits beams towards the accommodation groove to make the multiplexer disposed at the bottom of the accommodation groove combine the beams into one beam. The converging lens is disposed in the through hole to converge the one beam on the adapter.

20 Claims, 11 Drawing Sheets

(56) References Cited

U.S. PATENT DOCUMENTS

| | | |
|---|---|---|
| 8,488,244 B1 | 7/2013 | Li et al. |
| 8,537,468 B1 | 9/2013 | Wang et al. |
| 9,197,345 B2 * | 11/2015 | Nakajima ............ H04J 14/0307 |
| 9,401,773 B1 | 7/2016 | Gui et al. |
| 10,386,579 B2 * | 8/2019 | Saeki .................... G02B 6/4201 |
| 10,432,339 B2 | 10/2019 | Kawamura et al. |
| 10,615,883 B1 * | 4/2020 | Cheng ...................... H04J 14/02 |
| 10,725,253 B2 * | 7/2020 | Yamashita ............ G02B 6/2938 |
| 12,019,275 B2 * | 6/2024 | Kaneko ...................... H01S 5/40 |
| 2012/0189306 A1 * | 7/2012 | Du ........................ H01S 5/02251 |
| | | 398/65 |
| 2014/0133862 A1 * | 5/2014 | Fujimura ............. G02B 6/4215 |
| | | 398/79 |
| 2015/0229912 A1 * | 8/2015 | Masalkar ............. H04N 13/254 |
| | | 348/46 |
| 2015/0346432 A1 * | 12/2015 | Tamura ................ G02B 6/4261 |
| | | 398/88 |
| 2016/0147018 A1 | 5/2016 | Deng et al. |
| 2018/0128983 A1 | 5/2018 | Huang et al. |
| 2018/0284370 A1 * | 10/2018 | Ho ........................ G02B 6/4245 |
| 2019/0187390 A1 * | 6/2019 | Yamashita .......... G02B 6/29307 |
| 2020/0132274 A1 * | 4/2020 | Cheng ..................... H04J 14/02 |
| 2021/0149131 A1 * | 5/2021 | Du ........................ G02B 6/4209 |
| 2022/0271843 A1 | 8/2022 | Mii et al. |
| 2023/0022318 A1 * | 1/2023 | Kaneko ................ G02B 6/2938 |

\* cited by examiner

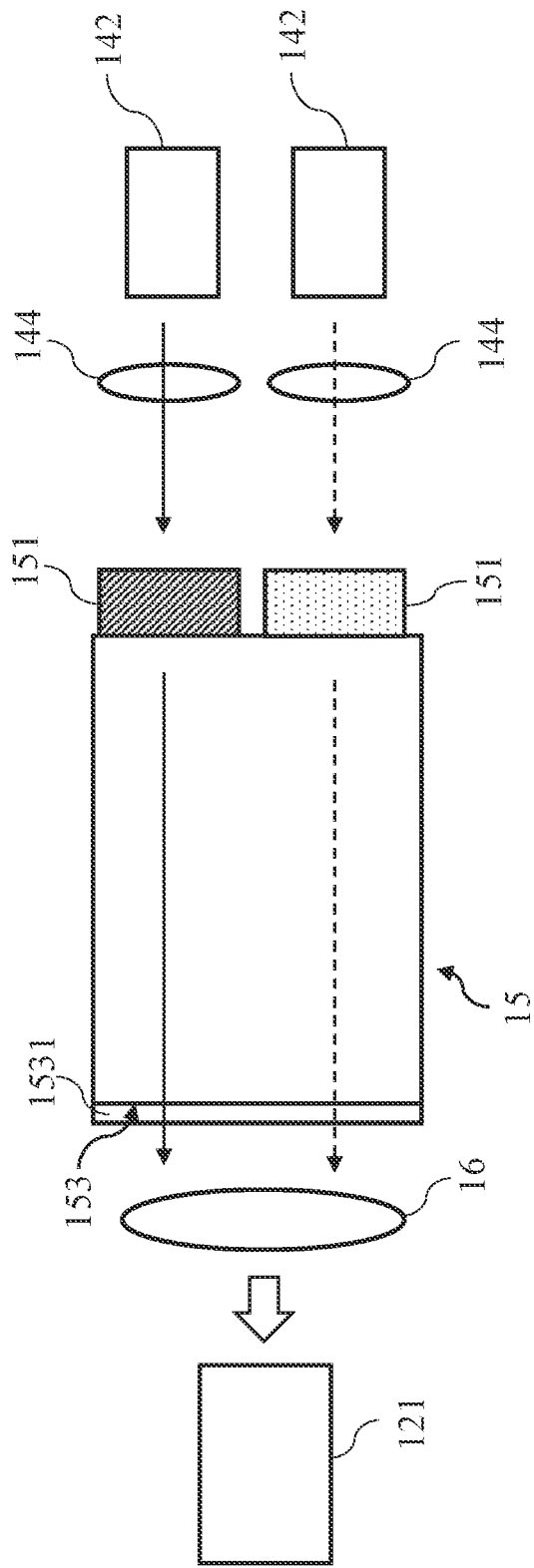
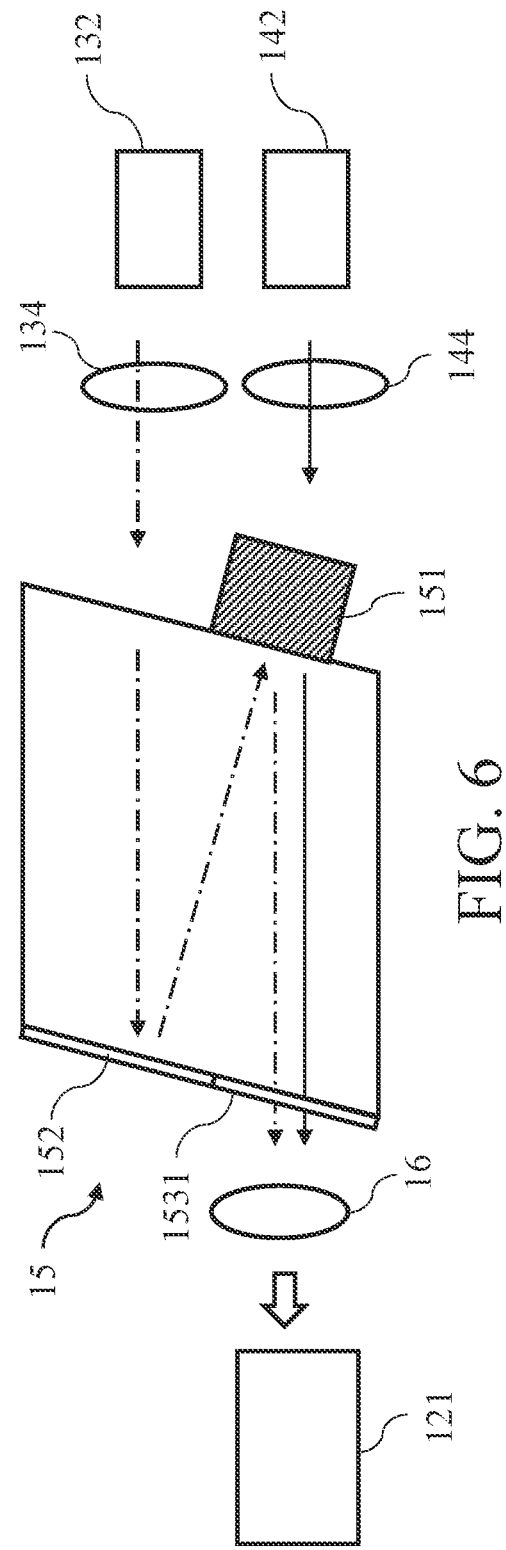

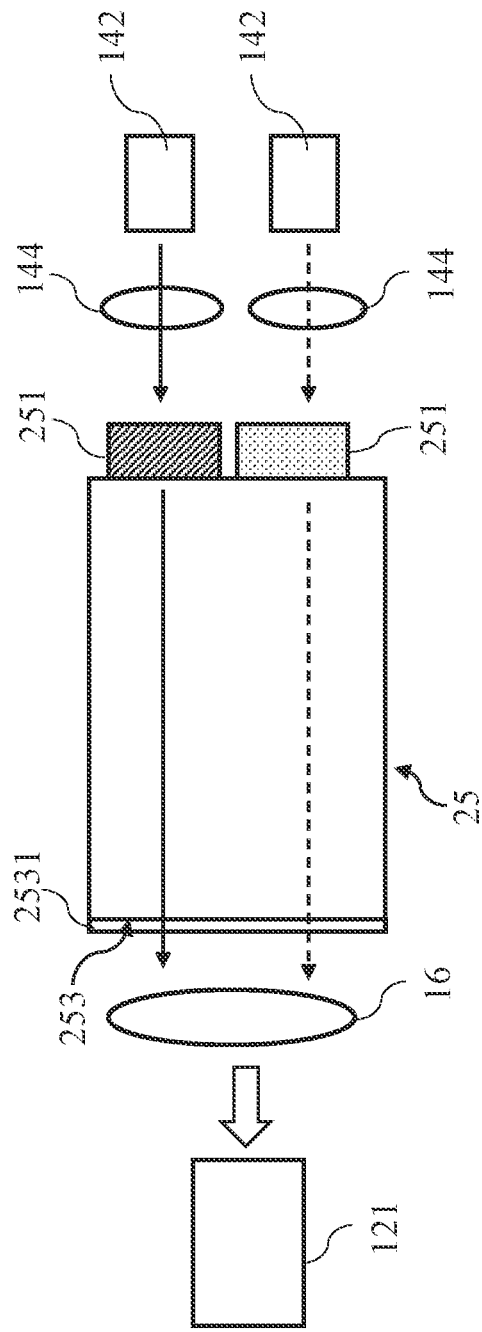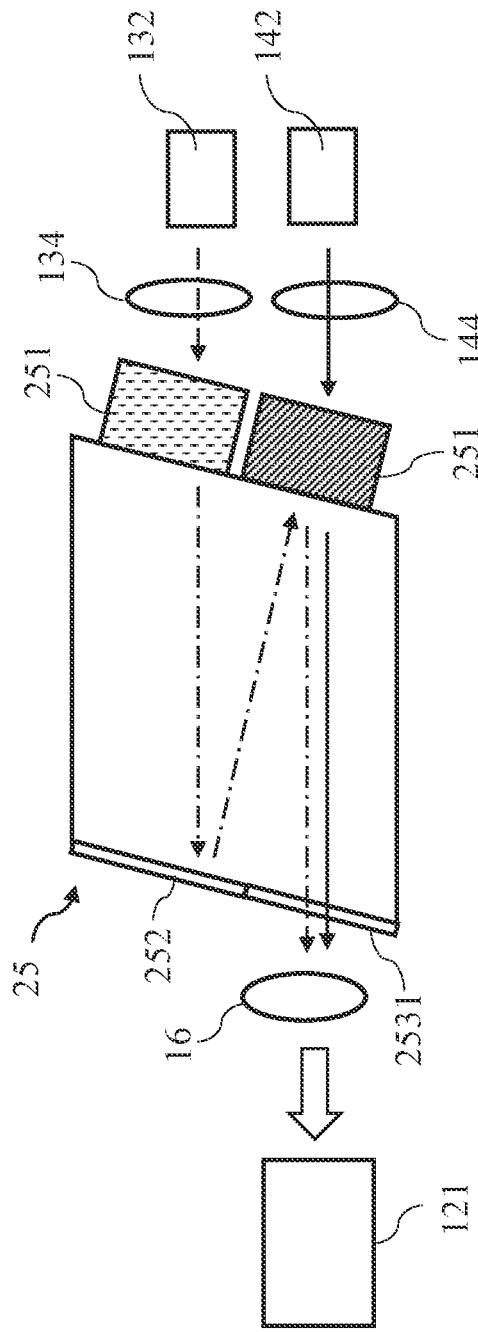

OPTICAL EMISSION ASSEMBLY AND OPTICAL MODULE

CROSS REFERENCE TO RELATED APPLICATION

This application claims the priority benefit of Chinese Patent Application Serial Number 202211653722.8, filed on Dec. 22, 2022, the full disclosure of which is incorporated herein by reference.

BACKGROUND

Technical Field

The present disclosure relates to the technical field of communications, and in particular, to an optical emission assembly and an optical module.

Related Art

In modern communication systems, the demand for network traffic increases very rapidly. Therefore, fiber broadband has gradually become the mainstream to make optical modules very important. Existing optical modules usually use wavelength division multiplexing (WDM) technology, which combines multiple light beams emitted by multiple light-emitting chips disposed on the same plane in an optical emission assembly into one light beam to accommodate more optical signals in a single fiber optic cable, to increase the amount of transmission of the optical signal in the fiber optic cable, so as to increase the transmission capacity of information.

However, in the design that multiple light-emitting chips are disposed on the same plane, the heat energy generated by the multiple light-emitting chips may not be effectively dissipated through the supporting base, which results in the problem of shortening the service life of the light-emitting chip or the problem that additional cooling chips need to be disposed between the multiple light-emitting chips and the supporting base.

Therefore, how to provide a scheme that solves the above-mentioned technical problems is the problem that those skilled in the art need to solve at present.

SUMMARY

The present disclosure provides an optical emission assembly and an optical module, which can solve the problem of shortening the service life of the light-emitting chip or the problem that additional cooling chips need to be disposed between multiple light-emitting chips and the supporting base since the heat energy generated by the multiple light-emitting chips may not be effectively dissipated through the supporting base in the design that the multiple light-emitting chips of the existing optical emission assembly are disposed on the same plane.

In order to solve the above technical problem, the present disclosure is implemented as follows.

The present disclosure provides an optical emission assembly, which includes a body, an adapter, a first light-emitting assembly, a second light-emitting assembly, a multiplexer and a converging lens. The body is provided with a first positioning groove, a second positioning groove, an accommodation groove and a through hole, one end of the accommodation groove communicates with the first positioning groove and the second positioning groove respectively, the other end of the accommodation groove communicates with the through hole, and a groove bottom of the first positioning groove communicates with a groove bottom of the second positioning groove. The adapter is connected to an outer surface of the body and includes an optical fiber ferrule, and the optical fiber ferrule is disposed corresponding to the through hole. The first light-emitting assembly includes a first heat-conducting base and N first light-emitting chips disposed on the first heat-conducting base, wherein N is a positive integer. When the first light-emitting assembly is installed in the first positioning groove, a surface of the first heat-conducting substrate provided with the N first light-emitting chips faces the groove bottom of the first positioning groove, and the N first light-emitting chips are configured to emit light beams toward the accommodation groove. The second light-emitting assembly includes a second heat-conducting base and M second light-emitting chips disposed on the second heat-conducting base, wherein M is a positive integer. When the second light-emitting assembly is installed in the second positioning groove, a surface of the second heat-conducting base provided with the M second light-emitting chips faces the groove bottom of the second positioning groove, and the M second light-emitting chips are configured to emit light beams toward the accommodation groove. The multiplexer is disposed at the bottom of the accommodation groove, and is configured to combine the light beams emitted by the N first light-emitting chips and the M second light-emitting chips into one light beam. The converging lens is disposed in the through hole, and is configured to converge the one light beam emitted from the multiplexer to the optical fiber ferrule.

The present disclosure provides an optical module, which includes an optical reception assembly and an optical emission assembly of the present disclosure.

In the embodiment of the optical emission assembly of the present disclosure, the multiple light-emitting chips are dispersed on different planes (that is, the multiple light-emitting chips are dispersedly disposed on the first heat-conducting base and the second heat-conducting base), so that there are two heat dissipation paths for the multiple light-emitting chips (that is, the heat energy generated by the multiple light-emitting chips are dissipated through the first heat-conducting base and the second heat-conducting base), which can dispersedly conduct heat energy, avoid heat accumulation on one path, and effectively help conduct the heat energy generated by the multiple light-emitting chips without additional cooling chips.

It should be understood, however, that this summary may not contain all aspects and embodiments of the present disclosure, that this summary is not meant to be limiting or restrictive in any manner, and that the disclosure as disclosed herein will be understood by one of ordinary skill in the art to encompass obvious improvements and modifications thereto.

BRIEF DESCRIPTION OF THE DRAWINGS

The features of the exemplary embodiments believed to be novel and the elements and/or the steps characteristic of the exemplary embodiments are set forth with particularity in the appended claims. The Figures are for illustration purposes only and are not drawn to scale. The exemplary embodiments, both as to organization and method of operation, may best be understood by reference to the detailed description which follows taken in conjunction with the accompanying drawings in which:

FIG. 5 is a schematic bottom view of optical paths of the optical emission assembly of FIG. 3;

FIG. 6 is a schematic side view of optical paths of the optical emission assembly of FIG. 3;

FIG. 8 is a schematic bottom view of optical paths of the optical emission assembly of FIG. 7;

FIG. 9 is a schematic side view of optical paths of the optical emission assembly of FIG. 7;

DETAILED DESCRIPTION OF THE EMBODIMENTS

Figure 1:
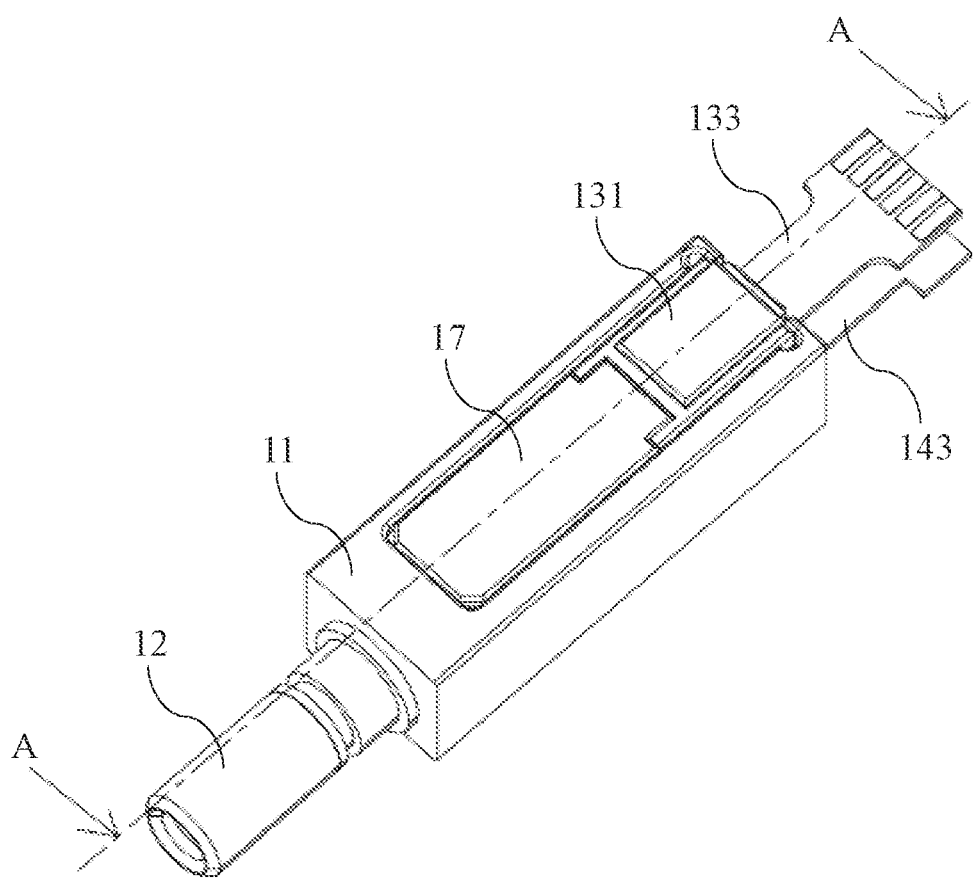
FIG. 1 is a schematic stereoscopic diagram of an optical emission assembly according to an embodiment of the present disclosure.

The present disclosure will now be described more fully hereinafter with reference to the accompanying drawings, in which exemplary embodiments of the disclosure are shown. This present disclosure may, however, be embodied in many different forms and should not be construed as limited to the embodiments set forth herein. Rather, these embodiments are provided so that this present disclosure will be thorough and complete, and will fully convey the scope of the present disclosure to those skilled in the art.

Certain terms are used throughout the description and following claims to refer to particular components. As one skilled in the art will appreciate, manufacturers may refer to a component by different names. This document does not intend to distinguish between components that differ in name but function. In the following description and in the claims, the terms "include/including" and "comprise/comprising" are used in an open-ended fashion, and thus should be interpreted as "including but not limited to".

The following description is of the best-contemplated mode of carrying out the disclosure. This description is made for the purpose of illustration of the general principles of the disclosure and should not be taken in a limiting sense. The scope of the disclosure is best determined by reference to the appended claims.

Moreover, the terms "include", "contain", and any variation thereof are intended to cover a non-exclusive inclusion. Therefore, a process, method, object, or device that includes a series of elements not only includes these elements, but also includes other elements not specified expressly, or may include inherent elements of the process, method, object, or device. If no more limitations are made, an element limited by "include a/an . . . " does not exclude other same elements existing in the process, the method, the article, or the device which includes the element.

It must be understood that when a component is described as being "connected" or "coupled" to (or with) another component, it may be directly connected or coupled to other components or through an intermediate component. In contrast, when a component is described as being "directly connected" or "directly coupled" to (or with) another component, there are no intermediate components. In addition, unless specifically stated in the specification, any term in the singular case also comprises the meaning of the plural case.

In the following embodiment, the same reference numerals are used to refer to the same or similar elements throughout the disclosure.

Figure 2:
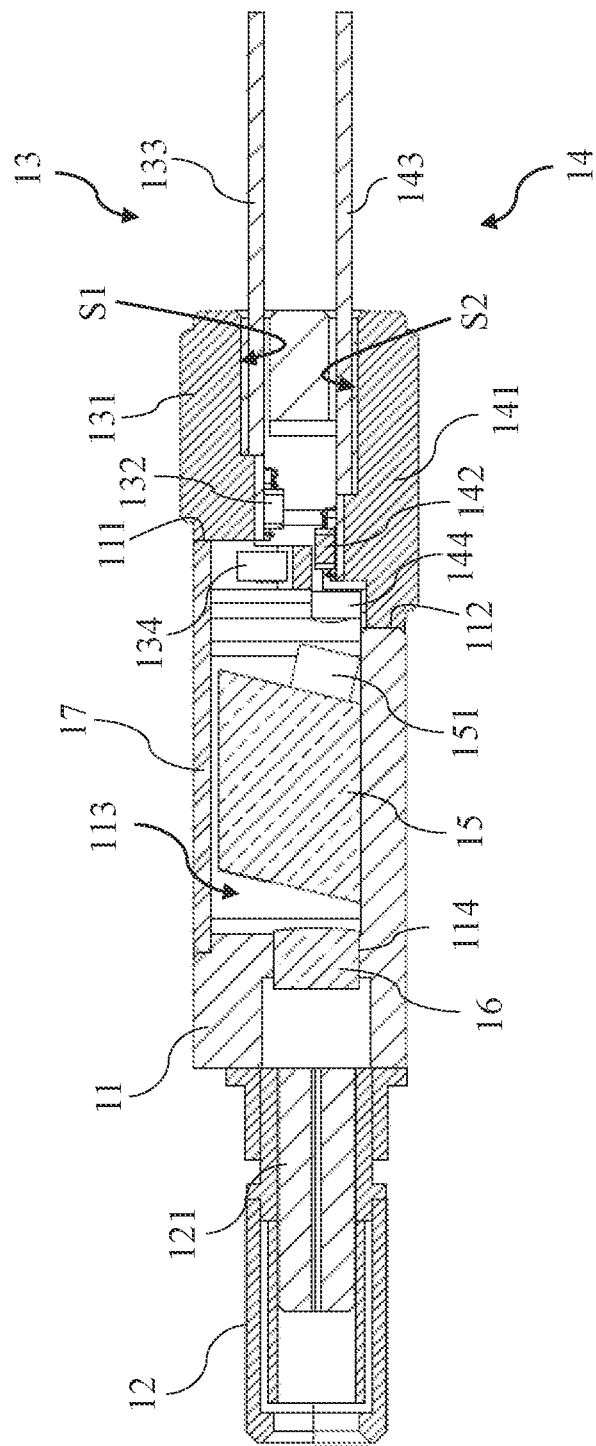
FIG. 2 is a schematic cross-sectional diagram of the optical emission assembly of FIG. 1 taken along line AA.
Figure 3:
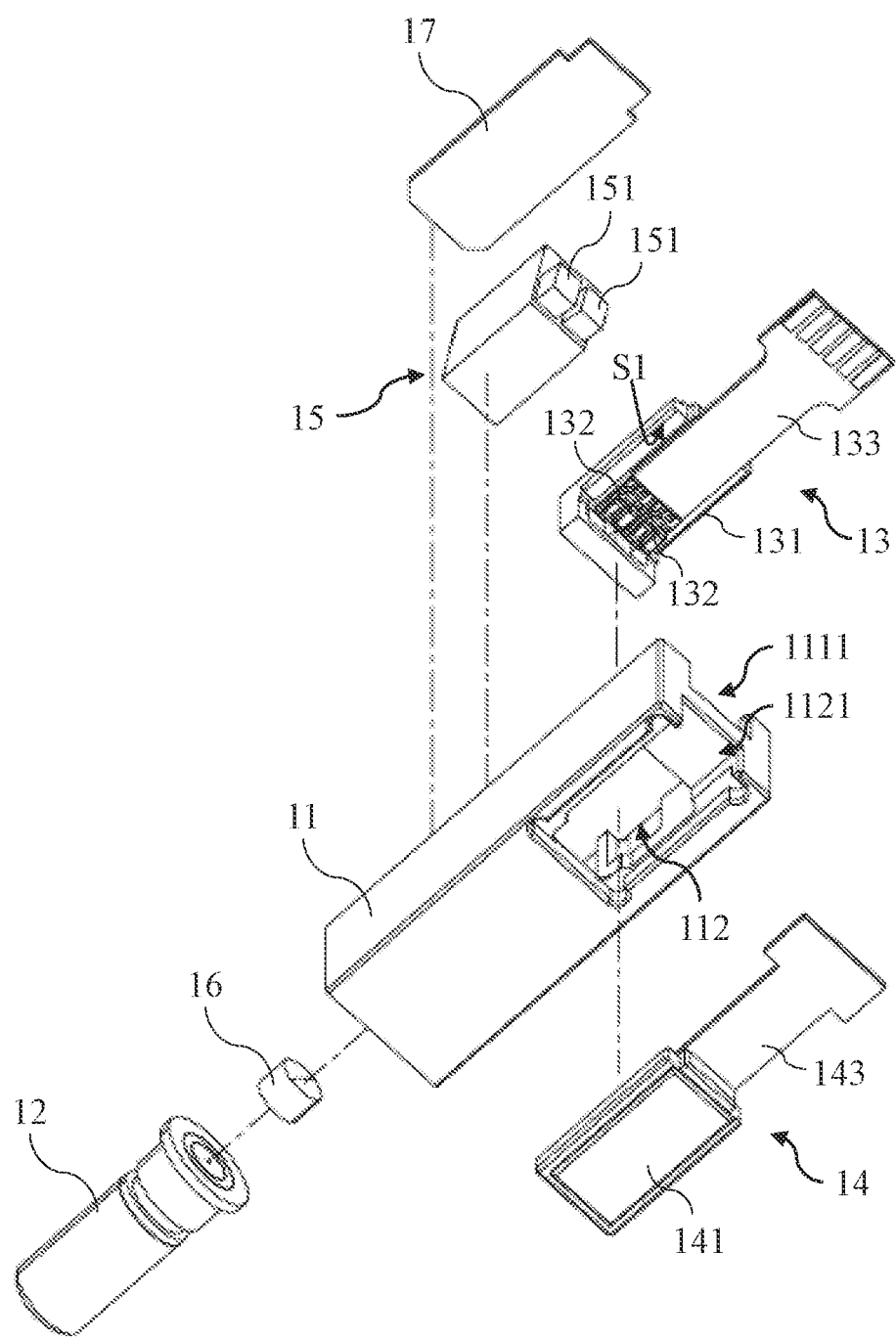
FIG. 3 is a schematic exploded diagram of a first viewing angle of the optical emission assembly of FIG. 1.
Figure 4:
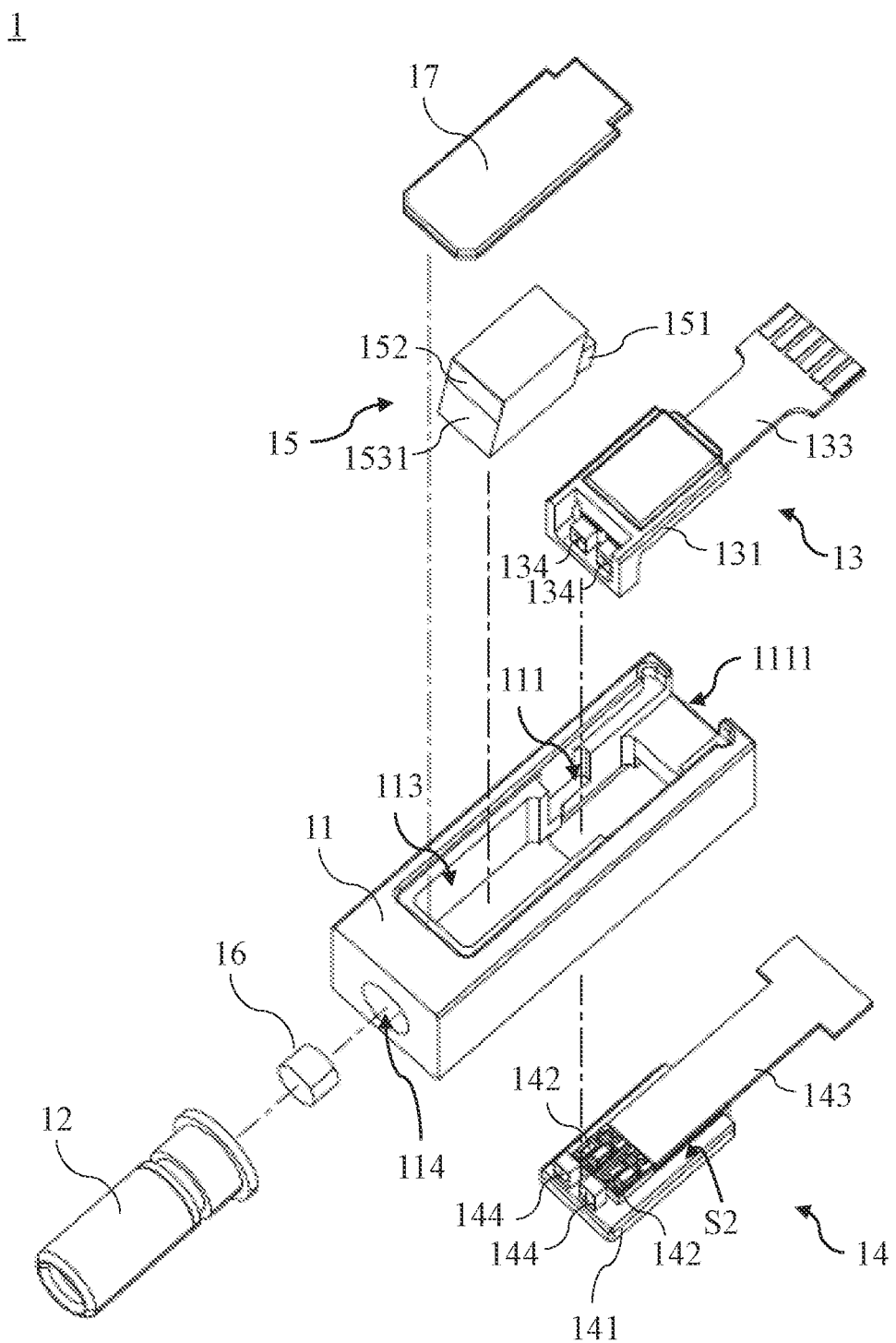
FIG. 4 is a schematic exploded diagram of a second viewing angle of the optical emission assembly of FIG. 1.

Please refer to FIG. 1 to FIG. 4, wherein FIG. 1 is a schematic stereoscopic diagram of an optical emission assembly according to an embodiment of the present disclosure, FIG. 2 is a schematic cross-sectional diagram of the optical emission assembly of FIG. 1 taken along line AA, FIG. 3 is a schematic exploded diagram of a first viewing angle of the optical emission assembly of FIG. 1, and FIG. 4 is a schematic exploded diagram of a second viewing angle of the optical emission assembly of FIG. 1. As shown in FIG. 1 to FIG. 4, an optical emission assembly 1 comprises a body 11, an adapter 12, a first light-emitting assembly 13, a second light-emitting assembly 14, a multiplexer 15 and a converging lens 16. The body 11 is provided with a first positioning groove 111, a second positioning groove 112, an accommodation groove 113 and a through hole 114, wherein one end of the accommodation groove 113 communicates with the first positioning groove 111 and the second positioning groove 112 respectively, the other end of the accommodation groove 113 communicates with the through hole 114, and a groove bottom of the first positioning groove 111 communicates with a groove bottom of the second positioning groove 112. The groove opening of the first positioning groove 111 faces towards the top of the optical emission assembly 1, and the groove opening of the second positioning groove 112 faces towards the bottom of the optical emission assembly 1. In this embodiment, the groove bottom of the first positioning groove 111 partly communicates with the groove bottom of the second positioning groove 112, but this embodiment is not intended to limit the present disclosure.

In this embodiment, the adapter 12 is connected to an outer surface of the body 11 and comprises an optical fiber ferrule 121, and the optical fiber ferrule 121 is disposed corresponding to the through hole 114. The optical fiber inside the optical fiber ferrule 121 may be a single-mode optical fiber or a multi-mode optical fiber.

The first light-emitting assembly 13 comprises a first heat-conducting base 131 and N first light-emitting chips 132 disposed on the first heat-conducting base 131, where N is a positive integer. The second light-emitting assembly 14 comprises a second heat-conducting base 141 and M second light-emitting chips 142 disposed on the second heat-conducting base 141, where M is a positive integer. The values of N and M can be the same or different. In this embodiment, N can be but not limited to 2, and M can be but not limited to 2. The wavelengths of light beams emitted by different first light-emitting chips 132 and different second light-emitting chips 142 are different. The first light-emitting chip 132 and the second light emitting chip 142 may be but not limited to laser chips. When the first light-emitting assembly 13 is installed in the first positioning groove 111, the surface S1 of the first heat-conducting base 131 provided with two first light-emitting chips 132 faces the groove bottom of the first positioning groove 111, and the two first light-emitting chips 132 are configured to emit light beams of different wavelengths toward the accommodation groove 113. When the second light-emitting assembly 14 is installed in the second positioning groove 112, the surface S2 of the second heat-conducting base 141 provided with two second light-emitting chips 142 faces the groove bottom of the second positioning groove 112, and the two second light-emitting chips 142 are configured to emit light beams of different wavelengths toward the accommodation groove 113.

Specifically, when the first light-emitting assembly 13 is installed in the first positioning groove 111 and the second light-emitting assembly 14 is installed in the second positioning groove 112, the surface S1 of the first heat-conducting base 131 provided with the two first light-emitting chips 132 faces the surface S2 of the second heat-conducting base 141 provided with the two second light-emitting chips 142, and the two first light-emitting chips 132 and the two second light-emitting chips 142 emit light beams towards the accommodating groove 113 communicating with the first positioning groove 111 and the second positioning groove 112.

In this embodiment, the multiplexer 15 is disposed at the bottom of the accommodation groove 113, and is configured to combine the light beams emitted by the two first light-emitting chips 132 and the two second light-emitting chips 142 into one light beam (that is, light beams of four different wavelengths are combined into one light beam. The converging lens 16 is disposed in the through hole 114 for converging the one light beam emitted from the multiplexer 15 to the optical fiber ferrule 121.

Therefore, in this embodiment, the optical emission assembly 1 realizes four-channel optical transmission, the heat energy generated by the two first light-emitting chips 132 is dissipated through the first heat-conducting base 131, and the heat energy generated by the two second light-emitting chips 142 is dissipated through the second heat-conducting base 141, which prevent multiple light-emitting chips from accumulating heat on one path, and solving the heat dissipation problem existing in the prior art.

In one embodiment, the first light-emitting assembly 13 may further comprise a first circuit board 133 electrically connected to two first light-emitting chips 132, and the second light-emitting assembly 14 may further comprise a second circuit board 143 electrically connected to two second light-emitting chips 142. The first circuit board 133 is configured to provide electrical signals for driving the two first light-emitting chips 132 to emit light beams, and the second circuit board 143 is configured to provide electrical signals for driving the two second light-emitting chips 142 to emit light beams. Since the side wall of the first positioning groove 111 away from the accommodation groove 113 can be provided with an opening 1111 communicating with the outside, and the side wall of the second positioning groove 112 away from the accommodation groove 113 can be provided with an opening 1121 communicating with the outside, the first circuit board 133 can extend out of the first positioning groove 111 through the opening 1111 of the first positioning groove 111 communicating with the outside, so as to receive the electrical signals from the outside and transmit the electrical signals to the two first light-emitting chips 132, and the second circuit board 143 can extend out of the second positioning groove 112 through the opening 1121 of the second positioning groove 112 communicating with the outside, so as to receive the electrical signals from the outside and transmit the electrical signals to the two second light-emitting chips 142.

In one embodiment, the optical emission assembly 1 may further comprise a cover plate 17, and the cover plate 17 covers a groove opening 1131 of the accommodation groove 113. Therefore, the cover plate 17 can be configured to protect the multiplexer 15 to prevent water vapor and/or dust from entering the accommodation groove 113 to avoid affecting the optical function of the multiplexer 15.

In one embodiment, the multiplexer 15 may be a thin-film filter (TFF) or an arrayed waveguide grating (AWG).

Please refer to FIG. 2 to FIG. 6, wherein FIG. 5 is a schematic bottom view of optical paths of the optical emission assembly of FIG. 3, and FIG. 6 is a schematic side view of optical paths of the optical emission assembly of FIG. 3. As shown in FIG. 2 to FIG. 6, when the multiplexer 15 is a thin-film filter, an incident surface of the multiplexer 15 is provided with two optical filter films 151 corresponding to the two second light-emitting chips 142, an emitting surface of the multiplexer 15 is provided with a reflective film 152 and a light outlet 153, and the two optical filter films 151 and the reflective film 152 are disposed obliquely opposite to each other. The light beams emitted by the two second light-emitting chips 142 enter the multiplexer 15 through the two optical filter films 151, and then are transmitted in a straight line. The light beams emitted by the two first light-emitting chips 132 enter the multiplexer 15, and then are reflected by the reflective film 152 and the two optical filter films 151, so as to combine with the light beams emitted by the two second light-emitting chips 142 and entering the multiplexer 15, to form the one beam output from the light outlet 153.

Specifically, the optical filter film 151 is a band-pass filter film, which is configured to allow light beams of a specific wavelength emitted by the corresponding second light-emitting chip 142 to pass through, and reflect light beams of other wavelengths. The light beams emitted by the two second light-emitting chips 142 and entering the multiplexer 15 through the corresponding two thin film filters 151 can pass through the light outlet 153 in a straight line and irradiate to the converging lens 16. The light beams emitted by the two first light-emitting chips 132 enter the multiplexer 15, and then are reflected by the reflective film 152 and the optical filter films 151, so as to combine with the light beams emitted by the two second light-emitting chips 142 and entering the multiplexer 15 through the corresponding two optical filter films 151, to form the one light beam output from the light outlet 153. The light outlet 153 may be provided with an anti-reflection film 1531 to increase the transmittance of the one light beam output from the light outlet 153.

Figure 7:
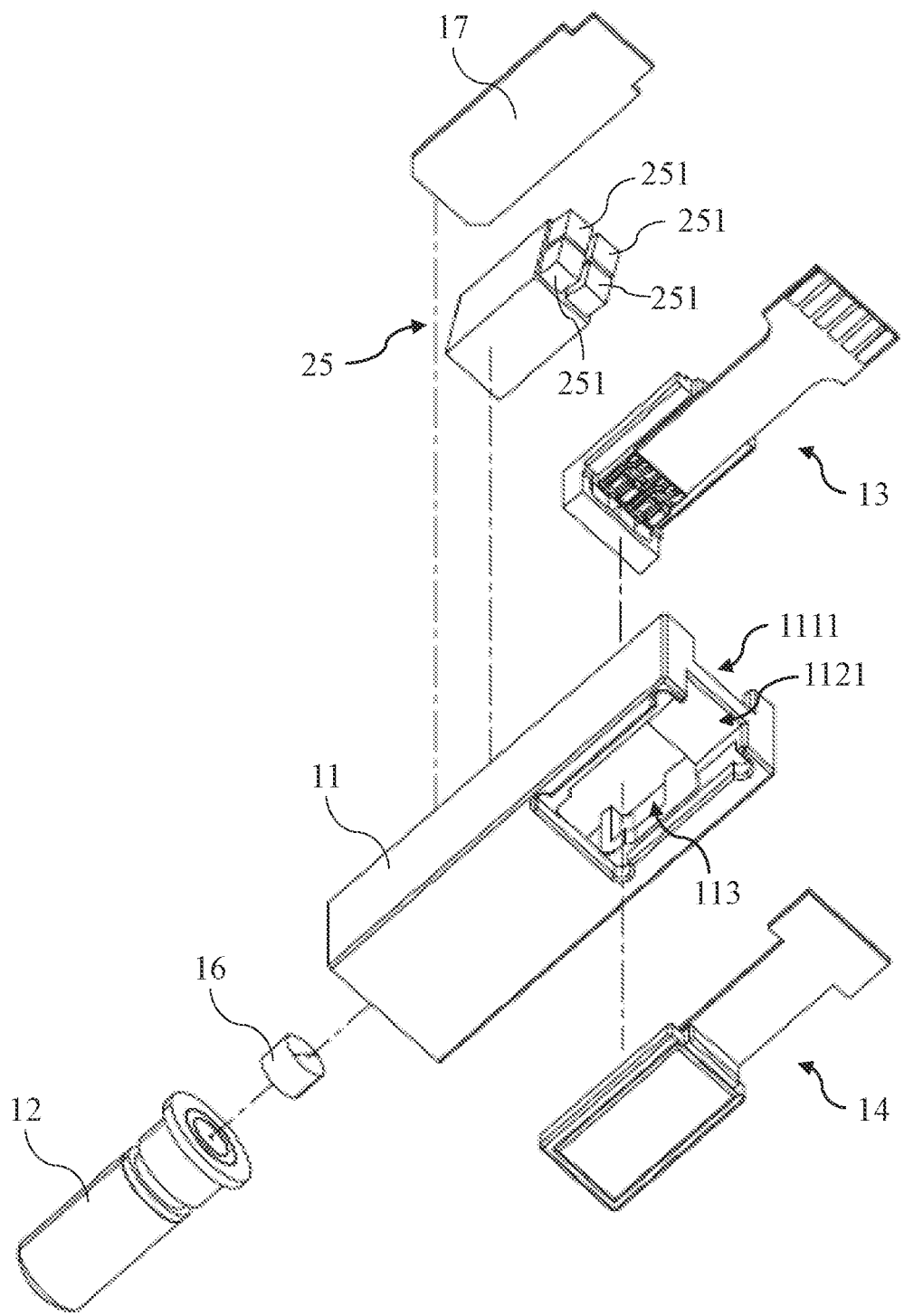
FIG. 7 is a schematic exploded diagram of an optical emission assembly according to an embodiment of the present disclosure.

In another embodiment, please refer to FIG. 7 to FIG. 9, wherein FIG. 7 is a schematic exploded diagram of an optical emission assembly according to an embodiment of the present disclosure, FIG. 8 is a schematic bottom view of optical paths of the optical emission assembly of FIG. 7, and FIG. 9 is a schematic side view of optical paths of the optical emission assembly of FIG. 7. As shown in FIG. 7 to FIG. 9, the difference between the optical emission assembly 2 of FIG. 7 and the optical emission assembly 1 of FIG. 3 is that the number of optical filter films 251 provided by the multiplexer 25 of FIG. 7 is larger than the number of optical filter films 151 provided by the multiplexer 15 of FIG. 3. Specifically, when the multiplexer 25 is a thin-film filter, an incident surface of the multiplexer 25 is provided with four optical filter films 251 corresponding to the two first light-emitting chips 132 and the two second light-emitting chips 142 (that is, one first light-emitting chip 132 corresponds to one optical filter film 251, and one second light-emitting chip 142 corresponds to one optical filter film 251), an emitting surface of the multiplexer 25 is provided with a reflective film 252 and a light outlet 253, and the reflective film 252 and the two optical filter films 251 corresponding to the two light-emitting chips 142 are disposed obliquely opposite to each other. The light beams emitted by the two second light-emitting chips 142 enter the multiplexer 25 through the corresponding two optical filter films 251, and then are transmitted in a straight line. The light beams emitted by the two first light-emitting chips 132 enter the multiplexer 25 through the corresponding two optical filter films 251, and then are reflected by the reflective film 252 and the non-corresponding optical filter films 251, so as to combine with the light beams emitted by the two second light-emitting chips 142 and entering the multiplexer 25 through the corresponding two optical filter films 251, to form the one light beam output from the light outlet 253.

Specifically, the optical filter film 251 is a band-pass filter film, which is configured to allow the light beam with a specific wavelength emitted by the corresponding light-emitting chip (i.e., the first light-emitting chip 132 or the second light-emitting chip 142) to pass through, and reflect light beams of other wavelengths. The light beams emitted by the two second light-emitting chips 142 and entering the multiplexer 25 through the corresponding two optical filter films 251 can be irradiated to the converging lens 16 in a straight line. The light beams emitted by the two first light-emitting chips 132 enter the multiplexer 25 through the corresponding two optical filter films 251, and then are reflected by the reflective film 252 and the optical filter films 251 corresponding to the two second light-emitting chips 142, so as to combine with the light beams emitted by the two second light-emitting chips 142 and entering the multiplexer 25 through the corresponding two optical filter films 251, to form the one light beam output from the light outlet 253. The light outlet 253 can be provided with an anti-reflection film 2531 to increase the transmittance of the one light beam output from the light outlet 253.

Figure 10:
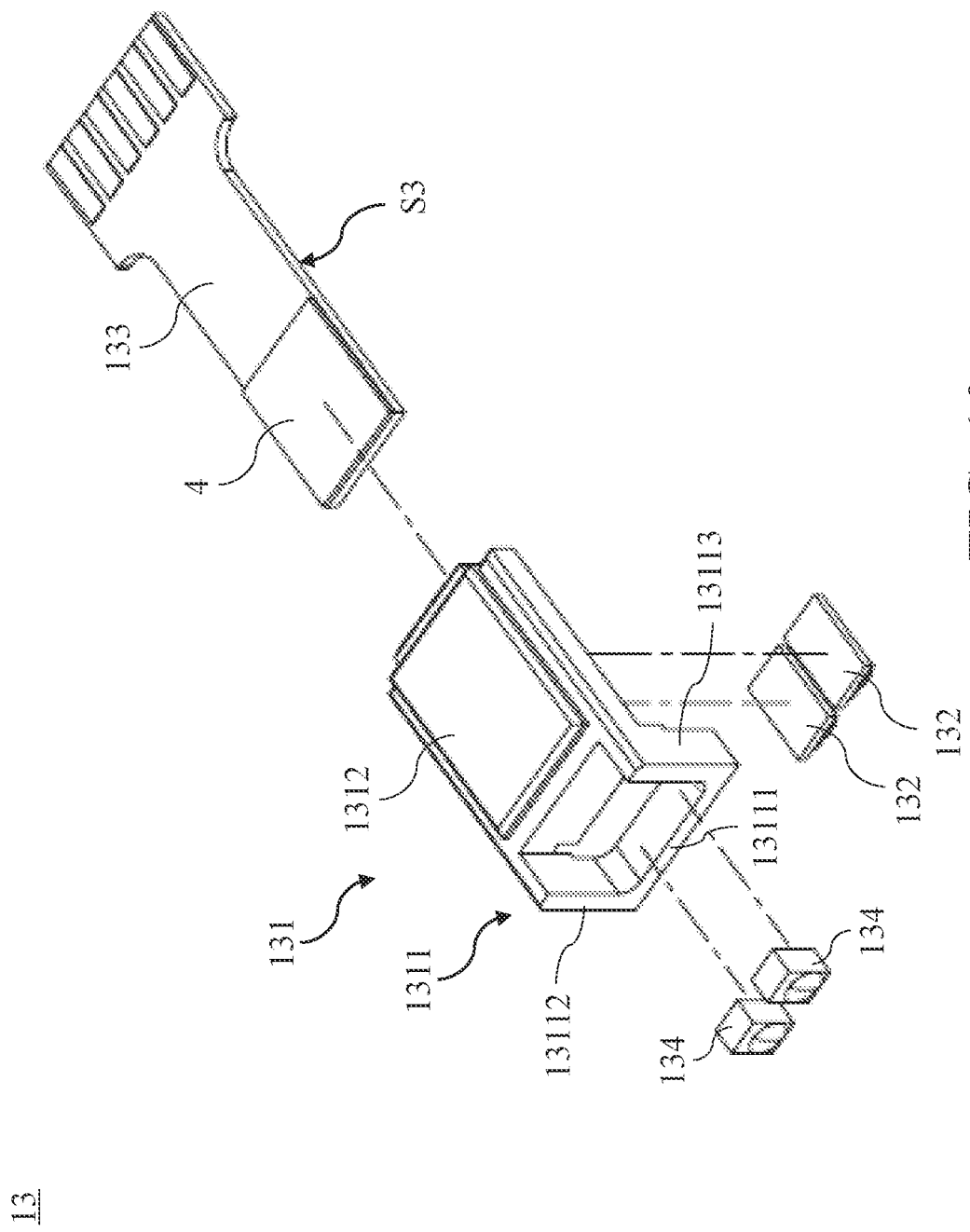
FIG. 10 is a schematic exploded diagram of a first viewing angle of the first light-emitting assembly of FIG. 3.
Figure 11:
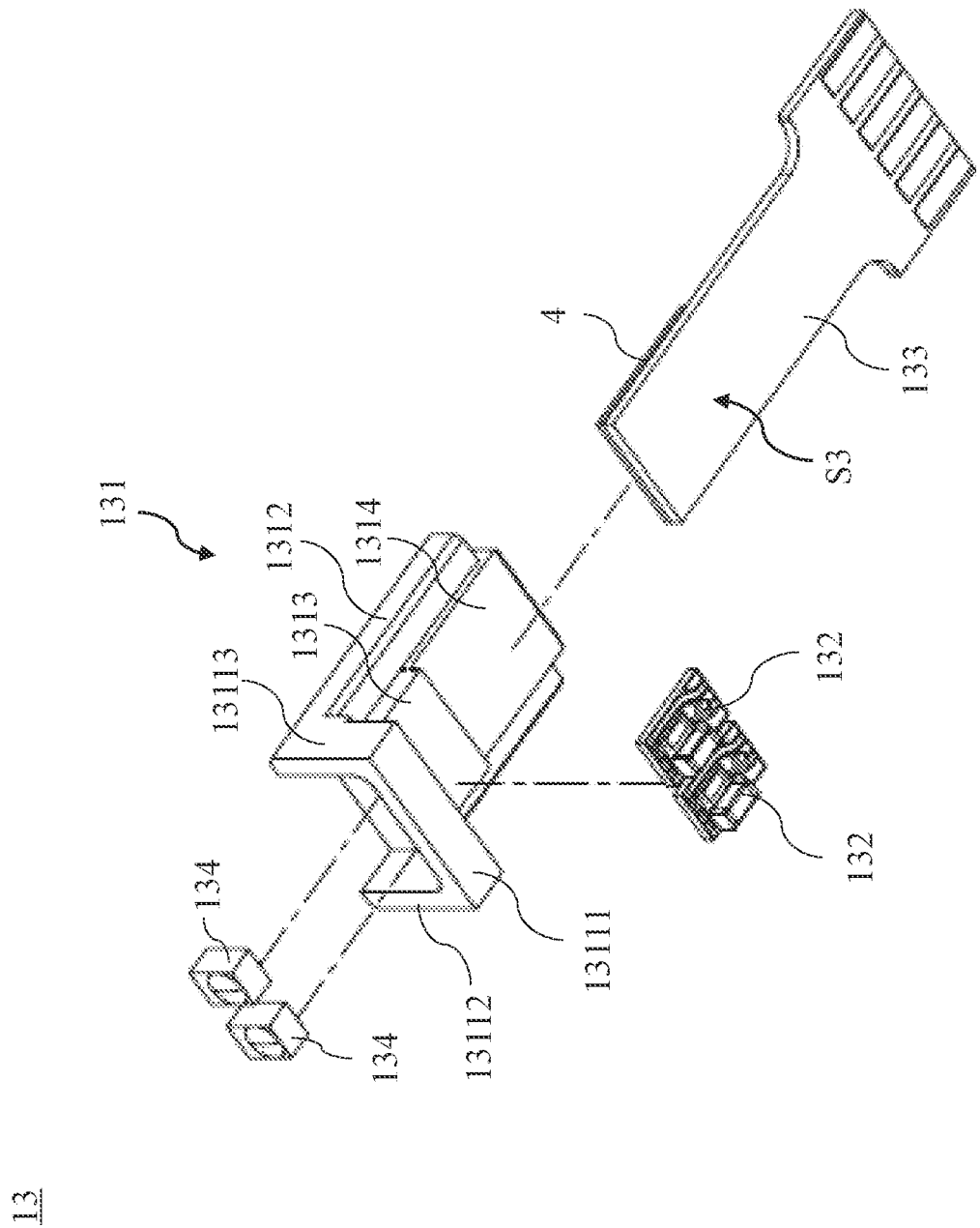
FIG. 11 is a schematic exploded diagram of a second viewing angle of the first light-emitting assembly of FIG. 3.
Figure 12:
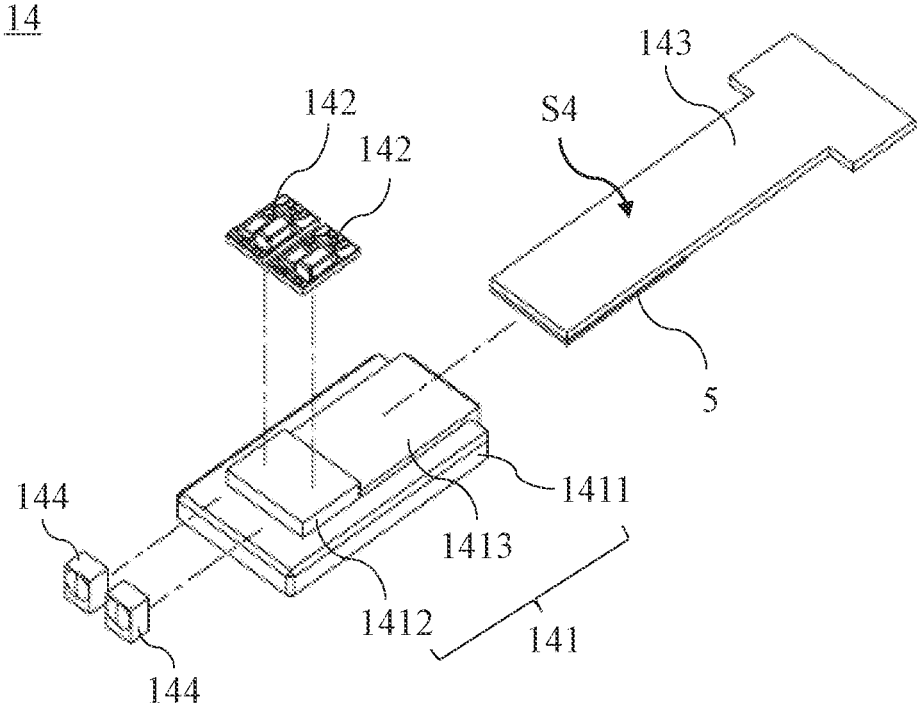
FIG. 12 is a schematic exploded diagram of a first viewing angle of the second light-emitting assembly of FIG. 3.
Figure 13:
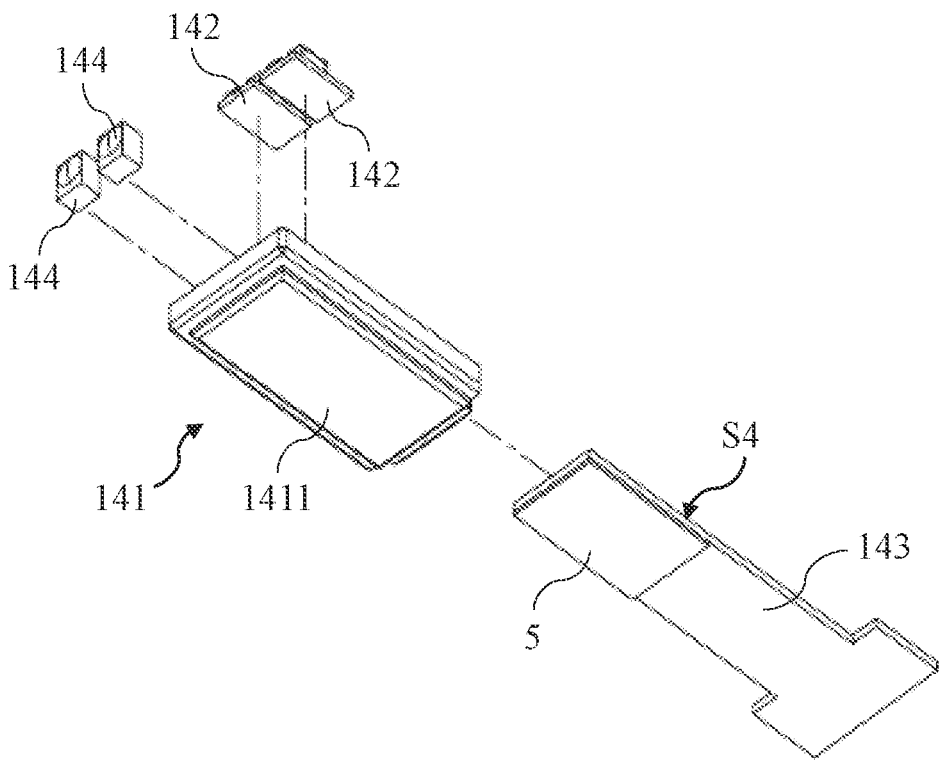
FIG. 13 is a schematic exploded diagram of a second viewing angle of the second light-emitting assembly of FIG. 3.

Please refer to FIG. 10 to FIG. 13, wherein FIG. 10 is a schematic exploded diagram of a first viewing angle of the first light-emitting assembly of FIG. 3, FIG. 11 is a schematic exploded diagram of a second viewing angle of the first light-emitting assembly of FIG. 3, FIG. 12 is a schematic exploded diagram of a first viewing angle of the second light-emitting assembly of FIG. 3, and FIG. 13 is a schematic exploded diagram of a second viewing angle of the second light-emitting assembly of FIG. 3. As shown in FIG. 10 and FIG. 11, the first light-emitting assembly 13 may further comprise two first collimating lenses 134 disposed on the first heat-conducting base 131, the two first light-emitting chips 132 are disposed in one-to-one correspondence with the two first collimating lenses 134, and the light beams emitted by each first light-emitting chip 132 enter the multiplexer 15 through the first collimating lens 134 corresponding thereto (that is, each first collimating lens 134 is located on the optical path of the corresponding first light-emitting chip 132). As shown in FIG. 12 and FIG. 13, the second light-emitting assembly 14 may further comprise two second collimating lenses 144 disposed on the second heat-conducting base 141, the two second light-emitting chips 142 are disposed in one-to-one correspondence with the two second collimating lenses 144, and the light beams emitted by each second light-emitting chip 142 enter the multiplexer 15 through the second collimator lens 144 corresponding thereto (that is, each second collimating lens 144 is located on the optical path of the corresponding second light-emitting chip 142).

In one embodiment, the active alignment technology is used to align the first collimating lens 134 with the first light-emitting chip 132 corresponding thereto, and align the second collimating lens 144 with the second light-emitting chip 142 corresponding thereto. Therefore, when the optical emission assembly 1 are assembled, the second heat-conducting base 141 provided with the two second light-emitting chips 142 and the second circuit board 143 can be installed in the second positioning groove 112, and then the active alignment technology is used to arrange the two second collimating lenses 144 on the second heat-conducting base 141; next, the first heat-conducting base 131 provided with the two first light-emitting chips 132 and the first circuit board 133 can be installed in the first positioning groove 111, and then the active alignment technology is used to arrange the two first collimating lenses 134 on the first heat-conducting base 131. Based on the above-mentioned assembly requirements, when the first light-emitting assembly 13 is installed in the first positioning groove 111 and the second light-emitting assembly 14 is installed in the second positioning groove 112, the two second collimating lenses 144 are closer to the accommodation groove 113 than the two first collimating lenses 134, as shown in FIG. 2. In addition, the first heat-conducting base 131 can comprise a U-shaped frame 1311 and a first heat-conducting body 1312, the U-shaped frame 1311 comprises a bottom portion 13111, and a first side-wall portion 13112 and a second side-wall portion 13113 extending from both sides of the bottom portion 13111 respectively, the first side-wall portion 13112 and the second side-wall portion 13113 are connected to the first heat-conducting body 1312, the two first collimating lenses 134 are disposed on a top surface of the bottom portion 13111 of the U-shaped frame 1311, and the two first light-emitting chips 132 are disposed on the first heat-conducting body 1312, as shown in FIG. 10 and FIG. 11.

In one embodiment, the first heat-conducting base 131 may comprise a first heat-conducting body 1312, and a first carrier 1313 and a second carrier 1314 disposed on the first heat-conducting body 1312, the first carrier 1313 carries the two first light-emitting chips 132, and the second carrier 1314 carries the first circuit board 133. The height of the first carrier 1313 is greater than the height of the second carrier 1314, and the two first light-emitting chips 132 and a surface S3 of the first circuit board 133 electrically connected to the two first light-emitting chips 132 are located at the same height, as shown in FIG. 2, FIG. 10 and FIG. 11. The first carrier 1313 and the second carrier 1314 can form a stepped structure. The first circuit board 133 is attached to the second carrier 1314 through the glue 4, such as the thermally conductive glue, so that the two first light-emitting chips 132 and the surface S3 of the first circuit board 133 electrically connected to the two first light-emitting chips 132 are located at the same height, which is beneficial to wire bonding and shortens the length of wire bonding. The first circuit board 133 can be, but not limited to, a printed circuit board (PCB), a flexible printed circuit board (FPC), or a rigid-flex board.

In one embodiment, the second heat-conducting base 141 may comprise a second heat-conducting body 1411, and a third carrier 1412 and a fourth carrier 1413 disposed on the second heat-conducting body 1411, the third carrier 1412 carries the two second light-emitting chips 142, and the fourth carrier 1413 carries the second circuit board 143. The height of the third carrier 1412 is greater than the height of the fourth carrier 1413, and the two second light-emitting chips 142 and a surface S4 of the second circuit board 143 electrically connected to the two second light-emitting chips 142 are located at the same height, as shown in FIG. 2, FIG. 12 and FIG. 13. The third carrier 1412 and the fourth carrier 1413 can form a stepped structure. The second circuit board 143 is attached to the fourth carrier 1413 through the glue 5, such as the thermally conductive glue, so that the two second light-emitting chips 142 and a surface S4 of the second circuit board 143 electrically connected to the two second light-emitting chips 142 are located at the same height, which is beneficial to wire bonding and shortens the length of the wire bonding. The second circuit board 143 can be, but not limited to, a printed circuit board, a flexible printed circuit board, or a rigid-flex board.

Figure 14:
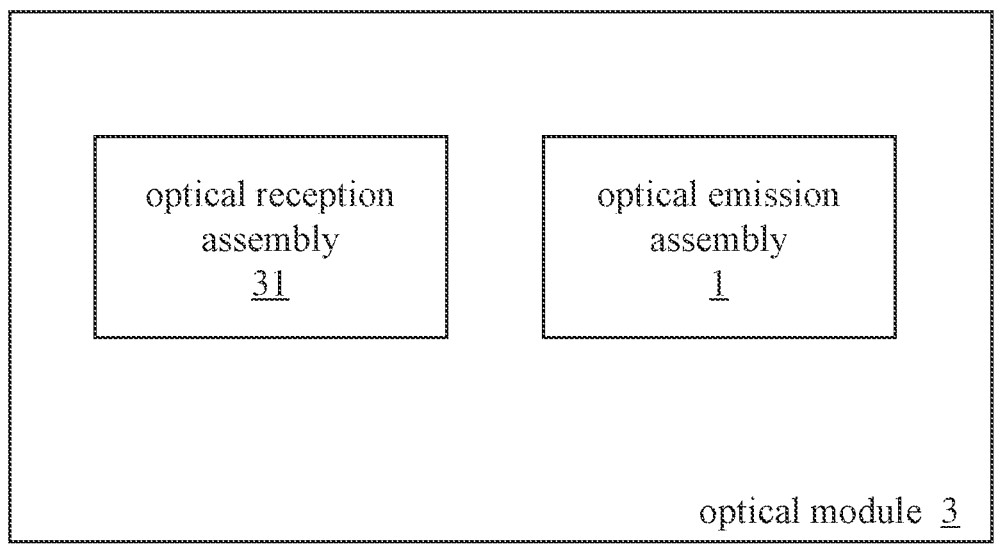
FIG. 14 is a schematic structural diagram of an optical module according to an embodiment of the present disclosure.

Please refer to FIG. 14, which is a schematic structural diagram of an optical module according to an embodiment of the present disclosure. As shown in FIG. 14, the optical module 3 may comprise an optical reception assembly 31 and an optical emission assembly 1. It should be noted that the optical module 3 may further comprise other necessary components such as a housing and an electrical interface circuit, which will not be described here.

In summary, in the optical emission assembly of the present disclosure, the multiple light-emitting chips are dispersed on different planes (that is, the multiple light-emitting chips are dispersedly disposed on the first heat-conducting base and the second heat-conducting base), so that there are two heat dissipation paths for the multiple light-emitting chips (that is, the heat energy generated by the multiple light-emitting chips are dissipated through the first heat-conducting base and the second heat-conducting base), which can dispersedly conduct heat energy, avoid heat accumulation on one path, and effectively help conduct the heat energy generated by the multiple light-emitting chips without additional cooling chips. In addition, by the design of the optical paths of the first light-emitting assembly and the second light-emitting assembly, the number of optical filter films of the thin-film filter used as the multiplexer is adjusted.

Although the present disclosure has been explained in relation to its preferred embodiment, it does not intend to limit the present disclosure. It will be apparent to those skilled in the art having regard to this present disclosure that other modifications of the exemplary embodiments beyond those embodiments specifically described here may be made without departing from the spirit of the disclosure. Accordingly, such modifications are considered within the scope of the disclosure as limited solely by the appended claims.

What is claimed is:

1. An optical emission assembly, comprising:
   a body provided with a first positioning groove, a second positioning groove, an accommodation groove and a through hole, one end of the accommodation groove communicating with the first positioning groove and the second positioning groove respectively, the other end of the accommodation groove communicating with the through hole, and a groove bottom of the first positioning groove communicating with a groove bottom of the second positioning groove;
   an adapter connected to an outer surface of the body and comprising an optical fiber ferrule, and the optical fiber ferrule being disposed corresponding to the through hole;
   a first light-emitting assembly comprising a first heat-conducting base and N first light-emitting chips disposed on the first heat-conducting base, N being a positive integer, wherein when the first light-emitting assembly is installed in the first positioning groove, a surface of the first heat-conducting base provided with the N first light-emitting chips faces the groove bottom of the first positioning groove, and the N first light-emitting chips are configured to emit light beams toward the accommodation groove;
   a second light-emitting assembly comprising a second heat-conducting base and M second light-emitting chips disposed on the second heat-conducting base, M being a positive integer, wherein when the second light-emitting assembly is installed in the second positioning groove, a surface of the second heat-conducting based provided with the M second light-emitting chips faces the groove bottom of the second positioning groove, and the M second light-emitting chips are configured to emit light beams toward the accommodation groove;
   a multiplexer disposed at a bottom of the accommodation groove and configured to combine the light beams emitted by the N first light-emitting chips and the M second light-emitting chips into one light beam; and
   a converging lens disposed in the through hole and configured to converge the one light beam emitted from the multiplexer to the optical fiber ferrule.

2. The optical emission assembly according to claim 1, further comprising a cover plate, the cover plate covering a groove opening of the accommodation groove.

3. The optical emission assembly according to claim 1, wherein the multiplexer is a thin-film filter or an arrayed waveguide grating (AWG).

4. The optical emission assembly according to claim 1, wherein when the multiplexer is a thin-film filter, an incident surface of the multiplexer is provided with (M+N) optical filter films corresponding to the N first light-emitting chips and the M second light-emitting chips, an emitting surface of the multiplexer is provided with a reflective film and a light outlet, the optical filter films corresponding to the M second light-emitting chips and the reflective film are disposed obliquely opposite to each other; the light beams emitted by the M second light-emitting chips enter the multiplexer through the M optical filter films corresponding thereto, and then are transmitted in a straight line; the light beams emitted by the N first light-emitting chips enter the multiplexer through the N optical filter films corresponding thereto, and then are reflected by the reflective film and non-corresponding optical filter films, so as to combine with the light beams emitted by the M second light-emitting chips and entering the multiplexer, to form the one beam output from the light outlet.

5. The optical emission assembly according to claim 4, wherein an anti-reflection film is provided on the light outlet.

6. The optical emission assembly according to claim 1, wherein when the multiplexer is a thin-film filter, an incident surface of the multiplexer is provided with M optical filter films corresponding to the M second light-emitting chips, an emitting surface of the multiplexer is provided with a reflective film and a light outlet, the M optical filter films and the reflective film are disposed obliquely opposite to each other; the light beams emitted by the M second light-emitting chips enter the multiplexer through the M optical filter films, and then are transmitted in a straight line; the light beams emitted by the N first light-emitting chips enter the multiplexer, and then are reflected by the reflective film and the M optical filter films, so as to combine with the light beams emitted by the M second light-emitting chips and entering the multiplexer, to form the one beam output from the light outlet.

7. The optical emission assembly according to claim 6, wherein an anti-reflection film is provided on the light outlet.

8. The optical emission assembly according to claim 1, wherein the first light-emitting assembly further comprises N first collimating lenses disposed on the first heat-conducting base, the N first light-emitting chips are disposed in one-to-one correspondence with the N first collimating lenses, and the light beams emitted by each first light-emitting chip enter the multiplexer through the first collimating lens corresponding thereto; the second light-emitting assembly further comprises M second collimating lenses disposed on the second heat-conducting base, the M second light-emitting chips are disposed in one-to-one correspondence with the M second collimating lenses, and the light beams emitted by each second light-emitting chip enter the multiplexer through the second collimating lens corresponding thereto.

9. The optical emission assembly according to claim 8, wherein the first heat-conducting base comprises a U-shaped frame and a first heat-conducting body, the U-shaped frame comprises a bottom portion, and a first side-wall portion and a second side-wall portion extending from both sides of the bottom portion respectively, the first side-wall portion and the second side-wall portion are connected to the first heat-conducting body, the N first collimating lenses are disposed on a top surface of the bottom portion of the U-shaped frame, and the N first light-emitting chips are disposed on the first heat-conducting body.

10. The optical emission assembly according to claim 9, wherein when the first light-emitting assembly is installed in the first positioning groove and the second light-emitting assembly is installed in the second positioning groove, the M second collimating lenses are closer to the accommodation groove than the N first collimating lenses.

11. The optical emission assembly according to claim 1, wherein the first light-emitting assembly further comprises a first circuit board electrically connected to the N first light-emitting chips, the first heat-conducting base comprises a first heat-conducting body, and a first carrier and a second carrier disposed on the first heat-conducting body, the first carrier carries the N first light-emitting chips, and the second carrier carries the first circuit board; a height of the first carrier is greater than a height of the second carrier, and the N first light-emitting chips and a surface of the first circuit board electrically connected to the N first light-emitting chips are located at the same height.

12. The optical emission assembly according to claim 1, wherein the second light-emitting assembly further comprises a second circuit board electrically connected to the M second light-emitting chips, the second heat-conducting base comprises a second heat-conducting body, and a third carrier and a fourth carrier disposed on the second heat-conducting body, the third carrier carries the M second light-emitting chips, and the fourth carrier carries the second circuit board; a height of the third carrier is greater than a height of the fourth carrier, and the M second light-emitting chips and a surface of the second circuit board electrically connected to the M second light-emitting chips are located at the same height.

13. An optical module, comprising an optical reception assembly and the optical emission assembly according to claim 1.

14. The optical module according to claim 13, wherein the optical emission assembly further comprises a cover plate, the cover plate covering a groove opening of the accommodation groove.

15. The optical module according to claim 13, wherein the multiplexer is a thin-film filter or an arrayed waveguide grating (AWG).

16. The optical module according to claim 13, wherein when the multiplexer is a thin-film filter, an incident surface of the multiplexer is provided with (M+N) optical filter films corresponding to the N first light-emitting chips and the M second light-emitting chips, an emitting surface of the multiplexer is provided with a reflective film and a light outlet, the optical filter films corresponding to the M second light-emitting chips and the reflective film are disposed obliquely opposite to each other; the light beams emitted by the M second light-emitting chips enter the multiplexer through the M optical filter films corresponding thereto, and then are transmitted in a straight line; the light beams emitted by the N first light-emitting chips enter the multiplexer through the N optical filter films corresponding thereto, and then are reflected by the reflective film and non-corresponding optical filter films, so as to combine with the light beams emitted by the M second light-emitting chips and entering the multiplexer, to form the one beam output from the light outlet.

17. The optical module according to claim 13, wherein when the multiplexer is a thin-film filter, an incident surface of the multiplexer is provided with M optical filter films corresponding to the M second light-emitting chips, an emitting surface of the multiplexer is provided with a reflective film and a light outlet, the M optical filter films and the reflective film are disposed obliquely opposite to each other; the light beams emitted by the M second light-emitting chips enter the multiplexer through the M optical filter films, and then are transmitted in a straight line; the light beams emitted by the N first light-emitting chips enter the multiplexer, and then are reflected by the reflective film and the M optical filter films, so as to combine with the light beams emitted by the M second light-emitting chips and entering the multiplexer, to form the one beam output from the light outlet.

18. The optical module according to claim 13, wherein the first light-emitting assembly further comprises N first collimating lenses disposed on the first heat-conducting base, the N first light-emitting chips are disposed in one-to-one correspondence with the N first collimating lenses, and the light beams emitted by each first light-emitting chip enter the multiplexer through the first collimating lens corresponding thereto; the second light-emitting assembly further comprises M second collimating lenses disposed on the second heat-conducting base, the M second light-emitting chips are disposed in one-to-one correspondence with the M second collimating lenses, and the light beams emitted by each second light-emitting chip enter the multiplexer through the second collimating lens corresponding thereto.

19. The optical module according to claim 13, wherein the first light-emitting assembly further comprises a first circuit board electrically connected to the N first light-emitting chips, the first heat-conducting base comprises a first heat-conducting body, and a first carrier and a second carrier disposed on the first heat-conducting body, the first carrier carries the N first light-emitting chips, and the second carrier carries the first circuit board; a height of the first carrier is greater than a height of the second carrier, and the N first light-emitting chips and a surface of the first circuit board electrically connected to the N first light-emitting chips are located at the same height.

20. The optical module according to claim 13, wherein the second light-emitting assembly further comprises a second circuit board electrically connected to the M second light-emitting chips, the second heat-conducting base comprises a second heat-conducting body, and a third carrier and a fourth carrier disposed on the second heat-conducting body, the third carrier carries the M second light-emitting chips, and the fourth carrier carries the second circuit board; a height of the third carrier is greater than a height of the fourth carrier, and the M second light-emitting chips and a surface of the second circuit board electrically connected to the M second light-emitting chips are located at the same height.

* * * * *